United States Patent
Hornung et al.

(10) Patent No.: US 7,904,676 B2
(45) Date of Patent: Mar. 8, 2011

(54) METHOD AND SYSTEM FOR ACHIEVING VARYING MANNERS OF MEMORY ACCESS

(75) Inventors: Bryan Hornung, Richardson, TX (US); Mark Shaw, Richardson, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 631 days.

(21) Appl. No.: 11/741,933

(22) Filed: Apr. 30, 2007

(65) Prior Publication Data

US 2008/0270713 A1    Oct. 30, 2008

(51) Int. Cl.
 *G06F 12/00*  (2006.01)
(52) U.S. Cl. .......................... 711/157; 711/156
(58) Field of Classification Search .............. 711/146, 711/141; 710/308; 709/202, 201, 216
See application file for complete search history.

(56) References Cited

U.S. PATENT DOCUMENTS

| | | | |
|---|---|---|---|
| 5,787,095 A | 7/1998 | Myers et al. | |
| 5,822,618 A * | 10/1998 | Ecclesine | 710/57 |
| 5,842,031 A | 11/1998 | Barker et al. | |
| 6,421,775 B1 * | 7/2002 | Brock et al. | 713/1 |
| 6,457,100 B1 | 9/2002 | Ignatowski et al. | |
| 6,487,619 B1 * | 11/2002 | Takagi | 710/105 |
| 6,668,308 B2 * | 12/2003 | Barroso et al. | 711/141 |
| 6,671,792 B1 | 12/2003 | McAllister | |
| 6,684,343 B1 * | 1/2004 | Bouchier et al. | 714/4 |
| 6,725,317 B1 | 4/2004 | Bouchier et al. | |
| 6,848,003 B1 | 1/2005 | Arimilli et al. | |
| 6,910,062 B2 | 6/2005 | Arimilli et al. | |
| 6,918,052 B2 | 7/2005 | Bouchier et al. | |
| 6,973,517 B1 | 12/2005 | Golden et al. | |
| 7,398,360 B2 * | 7/2008 | Hetherington et al. | 711/141 |
| 7,467,204 B2 * | 12/2008 | Fields et al. | 709/224 |
| 2002/0087813 A1 * | 7/2002 | Harris et al. | 711/148 |
| 2002/0144063 A1 | 10/2002 | Pier et al. | |
| 2003/0009641 A1 | 1/2003 | Arimilli et al. | |
| 2003/0131067 A1 | 7/2003 | Downer et al. | |
| 2004/0268044 A1 | 12/2004 | Heller, Jr. et al. | |
| 2005/0021913 A1 | 1/2005 | Heller, Jr. | |
| 2005/0240649 A1 | 10/2005 | Elkington et al. | |
| 2005/0246508 A1 | 11/2005 | Shaw | |
| 2006/0031672 A1 | 2/2006 | Soltis, Jr. et al. | |
| 2007/0245334 A1 * | 10/2007 | Nieh et al. | 717/168 |
| 2008/0162873 A1 * | 7/2008 | Zimmer et al. | 712/22 |

OTHER PUBLICATIONS

Planning Superdome Cofiguration; Building Blocks and Definitions, Glossary, Appendix A, pp. 287-295; Chapter 4, pp. 161-198.

* cited by examiner

*Primary Examiner* — Brian R Peugh
*Assistant Examiner* — Sam Chen

(57) ABSTRACT

A method and system for operating a computer system are disclosed. In at least some embodiments, the present invention relates to a method of operating a computer system that includes operating a first cell of the system in accordance with a first memory access configuration, and migrating a first attribute of a first core of the first cell to a second cell of the system. The method additionally includes configuring a portion of the first cell so that the first cell is capable of operating in accordance with a second memory access configuration, and migrating at least one of the first attribute and a second attribute from the second cell back to the first core of the first cell, whereby subsequently the first cell operates in the second mode of operation. In at least some embodiments, the first and second configurations are direct and agent access memory configurations, or vice-versa.

17 Claims, 3 Drawing Sheets

METHOD AND SYSTEM FOR ACHIEVING VARYING MANNERS OF MEMORY ACCESS

CROSS-REFERENCE TO RELATED APPLICATIONS

-

STATEMENT REGARDING FEDERALLY SPONSORED RESEARCH OR DEVELOPMENT

-

FIELD OF THE INVENTION

The present invention relates to computer systems and, more particularly, relates to systems and methods within computer systems that govern the accessing of memory.

BACKGROUND OF THE INVENTION

Given the high processing speeds that can be achieved by today's computer processing units, memory access speed has become a limiting factor in many computer systems. In order to reduce memory latency and avoid "hot spots" in which certain memory resources are overly taxed, many computer systems employ a shared memory system in which the memory is divided into multiple blocks, and where multiple processing units are allowed to access the same blocks of the memory at different or even substantially the same times. In some such computer systems, each block of memory is controlled by a respective memory controller that is capable of communicating with multiple processing units of the computer system.

Some computer systems employ sockets that each have multiple processing units and, in addition, also typically each have their own respective memory controllers that manage blocks of memory capable of being accessed by one or more of the processing units of the respective sockets. To reduce memory latency in some such systems, processing units located on a given socket may be able to access memory blocks controlled by memory controllers located on other sockets. Such operation, in which one socket directly accesses the memory resources of another socket, is commonly referred to as "memory interleaving", and systems employing such interleaving capability are commonly referred to as non-uniform memory access (NUMA) systems.

Yet the degree to which memory interleaving can be effectively implemented in conventional computer systems is limited. Memory interleaving as described above is typically restricted to small numbers of sockets, for example, to four sockets or less. To achieve systems having larger numbers of sockets that are capable of accessing each other's memory resources, the memory controllers of the sockets cannot be directly connected to the processing units of other sockets but rather typically need to be connected by way of processor agents. Yet the implementation of such systems employing processor agents tends to be complicated and inefficient both in terms of the operation of the processor agents and in terms of the extra burdens that are placed upon the operating system and applications running on such systems. For example, in such systems it is desirable that the operating system/applications be capable of adapting to changes in the memory architecture to avoid inefficient operation, something which is often difficult to achieve.

Additionally, it is increasingly desired that computer systems be scalable and otherwise adjustable in terms of their sockets (e.g., in terms of processing power and memory). For example, it may in one circumstance be desirable that a computer system utilize only a small number of sockets but in another circumstance become desirable or necessary that the computer system be modified to utilize a larger number of sockets. As the computer system is modified to include or not include larger numbers of sockets, a given manner of interleaving suited for either smaller or larger numbers of sockets may become more or less effective. Again for example, supposing that such a computer system employs the manner of interleaving described above as involving direct contact (not involving processor agents, sometimes referred to as glueless) among four or less sockets, the computer system's memory access performance may vary significantly as the computer system is modified between utilizing four or less sockets and greater than four sockets.

For at least these reasons, it would be advantageous if an improved system and method for achieving enhanced memory access capabilities in computer systems could be developed. More particularly, it would be advantageous if, in at least some embodiments, such a system and method enabled enhanced memory interleave capabilities in computer systems having large numbers of sockets with multiple processors and memory controllers, such that the processors of the various sockets could access different memory blocks controlled by memory controllers of other sockets in a manner that, in comparison with conventional systems, reduced memory latency and/or the occurrence of "hot spots". Additionally, it would be advantageous if, in at least some embodiments, such a system and method was capable of achieving satisfactory levels of memory interleave capabilities even where the number and/or type of system resources such as processors and memory devices being utilized by the system varied during system operation.

SUMMARY OF THE INVENTION

In at least some embodiments, the present invention relates to a method of operating a computer system. The method includes operating a first cell of the computer system in accordance with a first memory access configuration, and migrating a first attribute of a first core of the first cell to a second cell of the computer system. The method additionally includes configuring a first portion of the first cell so that the first cell is capable of operating in accordance with a second memory access configuration, and migrating at least one of the first attribute and a second attribute from the second cell back to the first core of the first cell, whereby subsequently the first cell operates in the second mode of operation.

Further, in at least some embodiments, the present invention relates to a method of operating a computer system. The method includes, at a first time, operating the computer system in accordance with an agent access memory configuration in which a first core of a first cell of the computer system communicates with a first memory controller of a second cell of the computer system by way of at least one processor agent and a fabric. The method additionally includes, at a second time that one of precedes and occurs after the first time, operating the computer system in accordance with a direct access memory configuration in which the first core of the first cell of the computer system communicates with a second memory controller of the first cell, not by way of the at least one processor agent and not by way of the fabric. The method further includes performing a transitioning procedure by which the computer system switches between the operating of the computer system in accordance with the agent access memory configuration and the operating of the computer system in accordance with the direct access memory configuration.

Additionally, in at least some embodiments, the present invention relates to a computer system. The computer system includes a first core on a first cell, and first and second memory controllers governing first and second memory segments, respectively, where the first memory controller is also implemented as part of the first cell. The computer system further includes a fabric, and at least one processor agent coupled at least indirectly to the first core, at least indirectly to the second memory controller, and to the fabric. When the computer system operates in accordance with an agent access memory configuration, the first core communicates with the second memory controller by way of the at least one processor agent and the fabric. Also, when the computer system operates in accordance with a direct access memory configuration, the first core communicates with the first memory controller independently of the at least one processor agent and the fabric.

DETAILED DESCRIPTION OF THE PREFERRED EMBODIMENT

Figure 1:
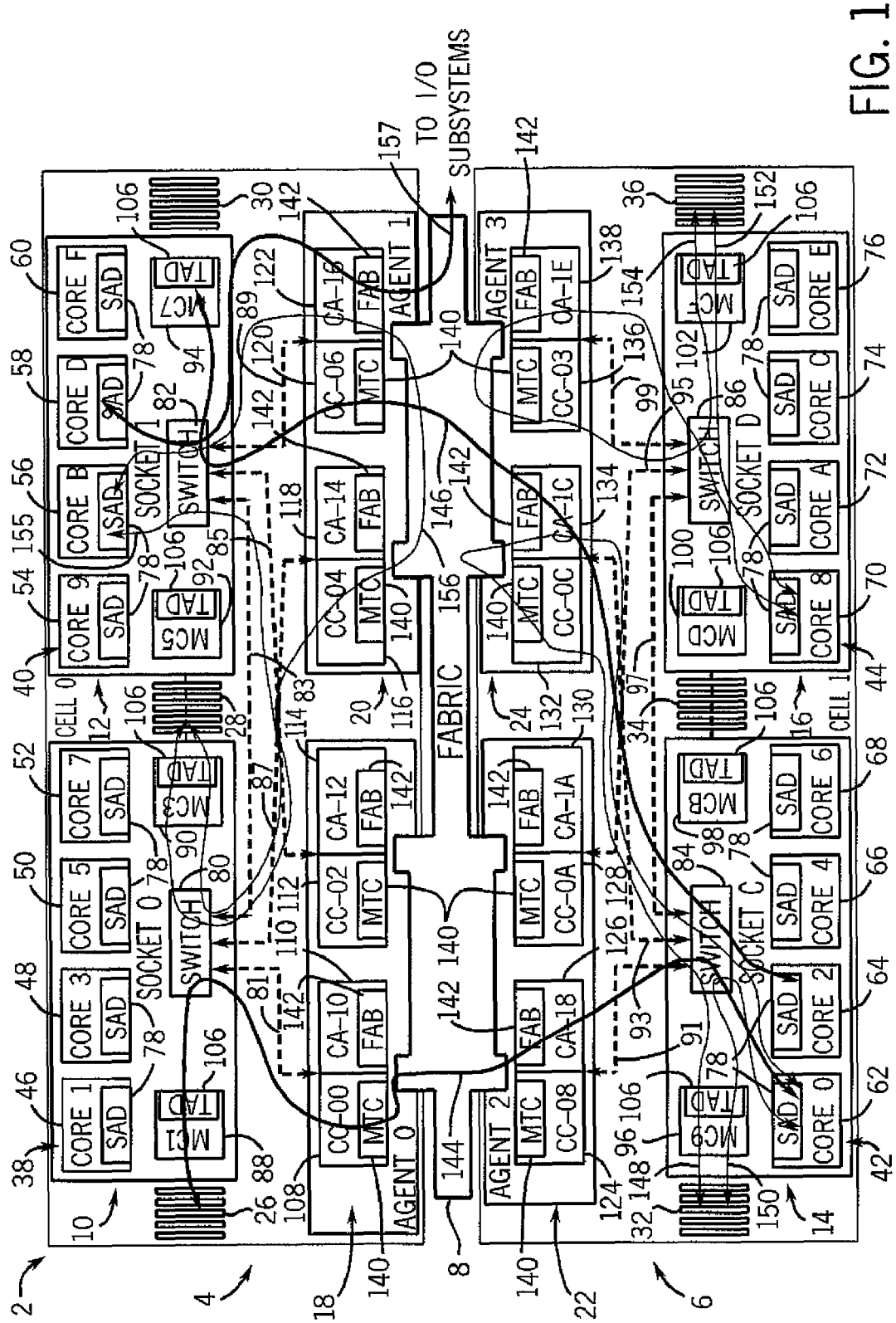
FIG. 1 shows in schematic form components of an exemplary computer system divided into multiple partitions that are linked by a fabric, where each partition includes memory blocks and multiple sockets with multiple processing units and memory controllers, and where the multiple sockets are capable of sharing and accessing, via communication links, the various memory blocks, in accordance with one embodiment of the present invention.

Referring to FIG. 1, components of an exemplary multi-processor computer system 2, divided into multiple partitions, are shown in a simplified schematic form, in accordance with at least one embodiment of the present invention. As shown, the computer system 2 in the present embodiment in particular includes two partitions, namely, a first cell 4, a second cell 6, and a fabric 8 to facilitate communication between those two cells. The two cells 4, 6 can be understood to be formed on two separate printed circuit boards that can be plugged into, and connected by, a backplane (on which is formed or to which is coupled the fabric 8). Although the computer system 2 of the present embodiment includes only the first and second cells 4 and 6, it is nevertheless intended to be representative of a wide variety of computer systems having an arbitrary number of cells and/or circuit boards. For example, in other embodiments, only a single cell or more than two cells are present.

In at least some embodiments, the computer system 2 can be a sx1000 super scalable processor chipset available from the Hewlett-Packard Company of Palo Alto, Calif., on which are deployed hard partitions formed by the cells 4, 6 (also known as "nPars"). Hard partitions formed by the cells 4, 6 allow the resources of a single server to be divided among many enterprise workloads and to provide different operating environments (e.g., HP-UX, Linux, Microsoft Windows Server 2003, OpenVMS) simultaneously. Such hard partitions also allow computer resources to be dynamically reallocated. Although the computer system 2 can be the super scalable processor chipset mentioned above, it need not be such a chipset and instead in other embodiments can also take a variety of other forms.

Each of the cells 4, 6 is capable of supporting a wide variety of hardware and software components. More particularly as shown, each of the cells 4, 6 includes a respective pair of sockets, namely, sockets 10 and 12 on the first cell 4 and sockets 14 and 16 on the second cell 6. Additionally, main memory of the cells 4, 6 is divided into multiple memory segments including memory segments or blocks 26, 28, 30 on the first cell 4 and memory segments or blocks 32, 34, 36 on the second cell 6. Additionally, each of the cells 4, 6 includes a respective pair of processor agents (PAs), namely, PAs 18 and 20 on the first cell 4 and PAs 22 and 24 on the second cell 6. In other embodiments, one or both of the cells 4, 6 can also include other components not shown, for example, input/output systems, and power management controllers. As will be discussed in further detail below, the computer system 2 is capable of supporting different types of memory access configurations for accessing the various multiple memory segments 26-36.

With respect to the sockets 10-16, they serve as a platform for supporting multiple hardware components. These hardware components include respective sets of cores or processing units 38, 40, 42, 44 on each respective socket, respective pairs of memory controllers (MCs) 88 and 90, 92 and 94, 96 and 98, and 100 and 102 on each respective socket, and respective switches 80, 82, 84 and 86 on each respective socket. With respect to the sets of cores 38, 40, 42, 44 on each respective socket 10, 12, 14, 16 in particular, the socket 10 includes four cores 46, 48, 50, 52, the socket 12 includes four cores 54, 56, 58, 60, the socket 14 includes four cores 62, 64, 66, 68, and the socket 16 includes four cores 70, 72, 74, 76. Notwithstanding the fact that, in the present embodiment, each of the sockets 10, 12, 14 and 16 has four cores, the present invention is intended to encompass a variety of other embodiments of sockets having other numbers of cores, such as sockets having less than four cores (or even only a single core) or more than four cores.

The switches 80-86 on each socket are crossbars capable of routing communications to and from the other components located on that socket. More particularly, the switch 80 allows for the routing of communications from and to any of the cores 46-52 and MCs 88, 90 on the socket 10, the switch 82 allows for the routing of communications from and to any of the cores 54-60 and MCs 92, 94 on the socket 12, the switch 84 allows for the routing of communications from and to any of the cores 62-68 and MCs 96, 98 on the socket 14, and the switch 86 allows for the routing of communications from and to any of the cores 70-76 and MCs 100, 102 on the socket 16. Additionally, each of the switches 80-86 also allows for the routing of communications to and from the respective socket 10-16, on which the respective switch is mounted, from and to the respective pairs of PAs 18, 20 or 22, 24 of the cells 4 or 6, respectively, on which the switch is mounted. That is, each of the switches 80, 82 is capable of directly communicating with each of the PAs 18, 20 as shown by dashed paths 81, 85, 87 and 89, while each of the switches 84, 86 is capable of directly communicating with each of the PAs 22, 24 as shown by dashed paths 91, 93, 95 and 99. Further, the switches located on a cell are capable of communicating with each other as well. For example, the switches 80, 82 can communicate with each other as shown by a dashed path 83 and the switches 84, 86 can also communicate with each other as shown by a dashed path 97.

Typically, the cores 46-76 of the sets of cores 38-44 located on the sockets 10-16 respectively are chips that are coupled to their respective sockets by way of electrical connectors, and are intended to be representative of a wide variety of central processing units. For example, in the present embodiment, the cores 46-76 are Itanium processing units as are available from the Intel Corporation of Santa Clara, Calif. In other embodiments, one or more of the cores 38-44 can take other forms including, for example, Xeon, Celeron and Sempron. In alternate embodiments, one or more of the cores can be another type of processing unit other than those mentioned above. Different cores on a given socket, on different sockets, and/or on different cells need not be the same but rather can differ from one another in terms of their types, models, or functional characteristics.

In other embodiments, one or more of the sockets 10-16 can include components other than or in addition to those mentioned above. Also, notwithstanding the fact that the present embodiment has two sockets on each of the first and second cells 4 and 6 respectively, one or more cells in other embodiments can either have a single socket or possibly more than two as well. In many embodiments, the number of sockets will exceed (possibly even greatly exceed) the number of sockets shown in FIG. 1. For example, in some embodiments, the number of sockets could be up to 64 different sockets. The present embodiment, with its limited numbers of cells 4, 6 and sockets 10, 12, 14 and 16, is provided as an exemplary embodiment of the present invention due to the ease with which it can be described and illustrated.

Internally, each of the cores of the sets of cores 38-44 in the present embodiment includes a variety of hardware and software components capable of supporting a wide variety of applications as well as tasks relating to the management of the various hardware and software components present on the cores as adapted in accordance with various embodiments of the present invention. More particularly, each of the cores includes a cache memory (not shown), which is smaller and faster in operation than the memory segments 26-36 of main memory discussed above, and which is capable of storing blocks of frequently used data accessed from the main memory in order to reduce the impact of memory latency that occurs when accessing the main memory (discussed in more detail below in regards with FIG. 2). Notwithstanding the presence of the cache memories, one or more of the memory segments 26-36 of the main memory still need to be accessed on a regular basis, for example, upon failures to locate requested information in the cache memories.

Further as shown, each of the cores 46-76 has a respective logic block referred to as a Source Address Decoder (SAD) 78. Depending upon the embodiment, the SADs 78 can be implemented as hardware components and/or can reside as software. In the present embodiment, each of the SADs 78 is pre-programmed to direct memory request signals to the MCs 88-102 either indirectly via the PAs 18-24 or directly (not via the PAs) depending upon a memory configuration of the computer system 2, as discussed in more detail below. Conversely, signals returning from the MCs 88-102 (either indirectly via the PAs 18-24 or more directly from the MCs 88-102) are processed in the SADs 78 for receipt by the cores 46-76. Typically, the SADs 78 associated with any of the cores 46-60 of the first cell 4 will only send requests to the PAs 18, 20 or the MCs 88-94 of that cell, while the SADs 78 associated with any of the cores 62-76 of the second cell 6 will only send requests to the PAs 22, 24 or the MCs 96-102 of that cell.

More particularly, in the present embodiment the SADs 78 process signals arising from the cores 46-76 and determine how to route at least some of those signals based upon the memory configuration used for accessing the various memory segments 26-36. In a first, "agent access" memory configuration, signals arising from the cores 46-76 and intended for the MCs 88-102 are routed indirectly not only via appropriate ones of the switches 80-86 but also via appropriate ones of the PAs 18-24 and the fabric 8. Typically, when operating in accordance with this memory configuration, all (or substantially all) such signals between cores and MCs/memory segments are routed in such indirect manner regardless of the relative proximity of the cores and MCs/memory segments. In contrast, in a second, "direct access" memory configuration, the routing of signals depends upon the relative locations of the cores 46-76 and the MCs 88-102 (and associated memory segments).

More particularly, in the direct access memory configuration, signals from respective ones of the cores 46-76 that are directed to respective ones of the MCs 88-102 that are located on the same respective cells are routed directly to those respective MCs via the respective switches 80-86 of the respective sockets of the respective cells, without being routed to any of the PAs 18-24 or routed via the fabric. Such memory accesses where the requesting core and the intended MC (and desired memory segment) are positioned on the same cell can be referred to as local memory accesses. However, signals from respective ones of the cores 46-76 that are directed to respective ones of the MCs 88-102 that are located on different cells are routed indirectly via appropriate ones of the switches 80-86 and appropriate ones of the PAs 18-24 through the fabric 8, in the same manner as signals are routed according to the agent access memory configuration. Such memory accesses where the requesting core and the intended MC (and desired memory segment) are positioned on different cells can be referred to as remote memory accesses. Generally speaking, although operation in the direct access memory configuration involves some signals being communicated indirectly by way of one or more of the PAs 18-24 and the fabric 8, typically as many signals as possible are routed in a manner that does not involve any of the PAs or the fabric.

Further as shown, in the present embodiment all input/output (I/O) subsystems are accessed by way of the fabric 8. Therefore, while the paths of signals communicated between the cores 46-76 and the MCs 88-102 as determined by the SADs 78 can vary depending upon the memory access configuration, in the present embodiment all signals communicated by the cores 46-76 that are intended for receipt by I/O subsystems are routed via the respective switches 80-86, appropriate ones of the PAs 18-24 and the fabric, irrespective of the memory configuration. In alternate embodiments, it is possible that the I/O subsystems will be coupled to other devices/structures of the computer system 2, such as directly to the PAs 18-24 themselves.

As for the MCs 88-102, these are responsible for managing and accessing the various memory segments 26-36 in response to read/write requests received from the cores 46-76, and for relaying signals back from those memory segments to the cores, as described in further detail below. The MCs 88-102 can be hardware chips such as application specific integrated circuit (ASICs) that are connected to the sockets 10-16 by way of electrical connectors. In other embodiments, one or more of the MCs 88-102 can be other type(s) of MCs. Additionally, while in the present embodiment two of the MCs 88-102 are provided on each of the sockets 10-16, the number of MCs per socket can vary in other embodiments (e.g., there can be only a single MC on each socket or possibly more than two as well).

Further as shown, each of the MCs 88-102 includes a respective logic block referred to as a Target Address Decoder (TAD) 106. As will be described in further detail below, the TADs 78 process signals arriving from the cores 46-76 and determine how to convert between (e.g., decode) memory address information received in those signals and memory locations within the memory segments 26-36. The TADs 106 also facilitate the return of information from the memory segments 26-36 back toward the cores 46-76. In the present embodiment, each of the TADs 106 can be implemented in either hardware or software, and is pre-programmed to convert between memory bank addresses and memory locations inside the memory segments 26-36.

With respect to the main memory itself, as discussed above, it is divided into multiple disjointed memory segments including, for example, the memory segments 26-36 of FIG. 1. The particular manner of sub-division of the main memory into multiple memory segments can vary depending upon the embodiment and upon various factors, for example, the requirements of the applications running on the cores 46-76. In at least some embodiments, the memory segments 26-36 are organized as dual in-line memory modules (DIMMs) that are respectively connected to one or more of the MCs 88-102 by way of electrical connectors. More particularly, in the present embodiment, the memory segment 26 and 30 are controlled by the MCs 88 and 94, respectively, while the memory segment 28 is controlled by both the MC 90 and the MC 92. Similarly, the memory segments 32 and 36 are respectively controlled by the MCs 96 and 102, respectively, while the memory segment 34 is managed by both the MC 98 and 100.

Exemplary communications among the various components of the computer system 2 as occurs in the aforementioned different agent access and direct access memory configurations, as well as between the cores of the computer system and the I/O subsystems, are illustrated in FIG. 1 by several exemplary communication paths 144, 146, 148, 150, 152, 154, 155, 156 and 157. In general, those of the communication paths that proceed between the sockets 10-16 and the PAs 18-24 follow the connections provided by the dashed communication paths 81, 85, 87, 89, 91, 93, 95 and 99 connecting the switches 80-86 with the PAs 18-24, and those of the communication paths that proceed between neighboring sockets of the same cell follow the connections provided by the dashed communication paths 83, 97. This should be understood to be the case even though the communication paths 144, 146, 148, 150, 152, 154, 155, 156 and 157 for clarity of illustration are not shown to directly overlap the dashed communication paths.

As already noted above, in the present embodiment, all communications between the cores 46-76 and the I/O subsystems occur by way of the PAs 18-24 and the fabric 8, as represented by the exemplary communication path 157. As for memory request signals, the communication paths 144, 146, 148, 150, 152, 154, 155, and 156 illustrate several communication paths some of which are illustrative of direct access memory configuration communications, some of which are illustrative of agent access memory configuration communications, and some of which are consistent with both agent access and direct access memory configuration communications. To begin, the communication paths 150, 152 and 155 show three exemplary signal paths that can be taken when the computer system 2 is operating in the direct access memory configuration and when cores are accessing local memory segments. The communication path 150 in particular shows the core 62 accessing the memory segment 32 via the MC 96 and the switch 84. Additionally, the communication path 152 shows the core 70 accessing the memory segment 36 via the MC 102 and the switch 86, while the communication path 155 shows the core 56 accessing the memory segment 28 by way of the MC 90 and switches 80 and 82 (and the communication path 83).

In contrast, the communication paths 148, 154 and 156 respectively show three exemplary signal paths that can be taken when the computer system 2 is operating in the agent access memory configuration and when cores are accessing local memory segments. Although these communication paths 148, 154 and 156 respectively connect the same cores and MCs as the communication paths 150, 152 and 155, respectively, these communication paths proceed via certain of the PAs 18-24 and via the fabric 8. In particular, the communication path 148 like the communication path 150 shows the core 62 accessing the memory segment 32 via the MC 96, except in this case the communication path proceeds via the switch 84, the PA 24 and the fabric 8. Additionally, the communication path 154 like the communication path 152 shows the core 70 accessing the memory segment 36 by way of the MC 102, except insofar as in this case the communication path proceeds via the switch 86, the PA 24 and the fabric 8. Further, the communication path 155 like the communication path 156 shows the core 56 accessing the memory segment 28 via the MC 90, except in this case the communication path proceeds via the switches 80 and 82, the PA 20 and the fabric 8.

As indicated by each exemplary scenario represented by the paths 148, 154 and 156, when operating in the agent access memory configuration, a memory request concerning a memory location sent by a given core on a given socket of a given cell is directed first (by way of the switch of the socket) to a first PA that is on the same cell as the requesting core. The first PA in response provides a signal to the fabric 8, which then directs the signal to a second PA that is on the same cell as the MC governing the memory segment on which is located the requested memory location. The second PA in turn provides a signal to that MC, which results in the desired accessing of the requested memory location. It should thus be evident that the accessing of memory in this mode of operation occurs by way of the fabric and two PAs, or possibly by way of the fabric and only one PA where the requesting core and MC governing the requested memory location are on the same cell.

By comparison, when operating in the direct access memory configuration accessing local memory segments, and as indicated by each exemplary scenario represented by the paths 148, 150 and 152, a memory request concerning a memory location sent by a respective core on a respective socket on a respective cell is routed directly to a MC on the same socket or another socket of the same respective cell merely by way of the appropriate switch(es) of the socket(s), without being routed through any of the PAs 18-24 or the fabric 8. The MC then provides the appropriate result by way of accessing the requested memory location and directly providing a response via the switches without any routing through any PAs or the fabric. It should be further evident from the particular paths 148, 150 and 152 shown in FIG. 1 that the direct access memory configuration can involve communications between cores and MCs that are on the same socket (as indicated by the paths 148 and 152), as well as cores and MCs that are on the same cell but not the same socket (as indicated by the path 150).

In addition to the accessing of local memory segments, it is also possible when operating in the direct access memory configuration to conduct remote memory accesses where the request originating core and the desired memory segment are located on different cells. In such cases, the manner of accessing the memory segments is the same with respect to operation in both the direct access and agent access memory configurations. For example, as shown in FIG. 1, the communication path 144 is employed to allow the core 62 to access the memory segment 26 by way of the MC 88 via the switches 80 and 84, the PAs 18 and 22, and the fabric 8 when the computer system 2 is operating in each of the direct access memory configuration and the agent access memory configuration. Likewise, the communication path 146 is employed to allow the core 64 to access the memory segment 30 by way of the MC 94 via the switches 82 and 84, the PAs 20 and 22, and the fabric 8 when the computer system 2 is operating in each of the two memory configurations.

With respect to the fabric 8 in particular, it is a hardware device formed as part of (or connected to) the backplane of the computer system 2. As discussed above, all requests and other messages to and from any of the cores with respect to the I/O subsystems are communicated via the fabric 8. Also as discussed above, all requests by any of the cores to access any of the MCs and associated memory segments when operating in the agent access memory configuration are directed through the fabric 8 irrespective of the location of the memory segment relative to the originating core (and even if the core and the appropriate MC for controlling that memory segment are on the same cell and/or same socket).

Additionally, requests by any of the cores to access memory segments by way of their respective MCs when the MCs and cores are located on different cells are also routed via the fabric 8, both when the computer system 2 is operating in the agent access memory configuration and also when the computer system is operating in the direct access memory configuration to perform remote memory accesses. However, communications between the cores and MCs do not pass via the fabric 8 during operation according to the direct access memory configuration when accessing a local memory segment. To allow for the above-described operation and usage of the fabric 8, each of the cells 4 and 6 are connected to the fabric 8 during configuration, when the cells are installed on the computer system 2. As will be described further below, signals communicated onto the fabric 8 must take on fabric (or global) addresses that differ from the physical addresses employed by the signals when outside of the fabric.

As for the PAs 18-24, each of the PAs 18-24 can be an integrated circuit (IC) chip albeit, in other embodiments, one or more of the PAs 18-24 can take other form(s). As already indicated above, the PAs 18-24 form an intermediary by which signals directed from the cores 46-76 and/or the MCs 88-102 by way of the switches 80-86 are provided to the fabric 8, and vice-versa. Also, although the present embodiment envisions the I/O subsystems as being coupled to the fabric 8, in alternate embodiments, the PAs 18-24 can be directly coupled to one or more of the I/O subsystems rather than by way of paths such as the path 154 of FIG. 1 that passes through the fabric.

More particularly as shown in FIG. 1, each of the PAs 18-24 has located thereon two coherency controllers (CCs), namely, CCs 108 and 112 on the PA 18, CCs 116 and 120 on the PA 20, CCs 124 and 128 on the PA 22, and CCs 132 and 136 on the PA 24. In addition to the CCs, each of the PAs 18-24 also has located thereon two caching agents (CAs), namely, CAs 110 and 114 on the PA 18, CAs 118 and 122 on the PA 20, CAs 126 and 130 on the PA 22, and CAs 134 and 138 on the PA 24. As illustrated by the communication paths 144, 146, 148, 154 and 156, the CCs 108, 112, 116, 120, 124, 128, 132, 136 in particular process signals that are being directed toward, or received from, the MCs 88-102 (via the switches 80-86). In contrast, the CAs 110, 114, 118, 122, 126, 130, 134 and 138 process signals that are being received from, or directed toward, the cores 46-76 (via the switches 80-86).

In the computer system 2, the CCs and CAs serve several purposes. To begin with, the CCs are particularly responsible for resolving coherency conflicts within the computer system 2 relating to the accessing of the memory segments 26-36 by way of the MCs 88-102 in an agent access memory configuration or in collaboration with the MCs 88-102 in a direct access memory configuration. Conflicts can arise since, in addition to residing within home memory segments, more recent copies of memory locations can also be resident within one or more local cache memories of the cores 46-76. To reduce or eliminate such conflicts and maintain a consistent, coherent view of main memory, the CCs employ a directory based cache coherency control protocol, which is described further below. Although such a coherency protocol can be employed, it should be understood that in alternate embodiments other coherency protocols can be used including for example, invalidate protocols such as the MESI and update protocols such as the snooping protocol. When the computer system 2 is operating in a direct access memory configuration in particular, the sockets 10-16 also support a coherency protocol, which tracks ownership in both local cores and the CCs (which track ownership for the rest of the cores in the partition). The protocol used by the sockets can be, for example, a directory-based protocol or a snooping-based protocol.

In the present embodiment in which the CCs employ a directory based cache coherency protocol, each of the CCs maintains a directory (for example, a table) for each memory location of the main memory. Each row of the directory of a given CC includes information indicating which of the memory segments 26-36 has ownership (the home memory segment) of each memory location, as well as information indicating which of the cores 46-76 has the most updated copy of that location. Each location of the directory can be accessed by a subset of the address bits. By searching through its directory, the given CC can also determine if alternate updated copies of that memory location exist within another one or more of the cores. If so, asynchronous signals or "snoops" can be issued to the core holding the updated copy of the memory location for retrieval, thus resulting in the returning of the most updated copy of the memory location in response to a read/write request.

As shown, each of the CCs 108, 112, 116, 120, 124, 128, 132, and 136 in particular includes an instance of a Memory Translation CAM (MTC) 140, which can be implemented as a pre-programmed logic block. The respective MTC 140 of each CC is responsible for converting fabric addresses into local physical addresses for every memory access signal received by the respective MTC off of the fabric 8 when the computer system 2 is operating according to the agent access memory configuration, and also for performing such conversions from fabric addresses to local physical addresses with respect to every remote memory access signal received off of the fabric when the computer system is operating in the direct access memory configuration. These local physical addresses can be then used by the MCs 88-102 that are in communication with the respective CCs (e.g., to retrieve the information from the requested memory location).

Also, the MTCs 140 of the CCs are used to determine the coherency flow of the received requests. To issue snoops, a global address routed via the fabric 8 can be converted to a local physical address by way of one of the MTCs 140. Each MTC 140 also gives an indication about whether a given memory address corresponds to part of a direct access block of memory or part of an agent access block of memory. If the line is part of an agent access block of memory, then the corresponding CC will issue snoops (if required, as determined by the local directory) to both cores on the cell with which it is associated as well as to cores on different cells. If the line is part of a direct access block of memory, then the CC will only issue snoops to cores on remote cells (if required, as determined by the local directory).

In addition to the CCs, each of the PAs 18-24 also has located thereon two caching agents (CAs), namely, CAs 110 and 114 on the PA 18, CAs 118 and 122 on the PA 20, CAs 126 and 130 on the PA 22, and CAs 134 and 138 on the PA 24. With respect to the CAs 110, 114, 118, 122, 126, 130, 134 and 138, these are intended to perform several functions when the computer system is in the agent access memory configuration. To begin, in the present embodiment, the CAs are responsible for executing the coherency flow determined by the CCs (e.g., by executing the snoops issued by the CCs). Additionally, the CAs perform address abstraction for signals routed off via the fabric 8, by which local physical addresses referenced in signals received from the cores 46-76 are converted into fabric (global) addresses appropriate for the fabric 8, and vice-versa. In other embodiments, one or more of the CAs 110, 114, 118, 122, 126, 130, 134 and 138 can be programmed to perform other functions than those mentioned above.

More particularly with respect to the performing of address abstraction, each of the CAs 110, 114, 118, 122, 126, 130, 134 and 138 includes a respective Fabric Abstraction Block (FAB) 142. When the computer system 2 is operating according to the agent access memory configuration or accessing remote memory segments when in the direct access memory configuration, each respective FAB 142 allows its respective CA to convert local physical addresses such as those arriving on memory request signals from the cores 46-76 (via the switches 80-86) into fabric (global) addresses suitable for determining where the signals are sent within the fabric 8 for accessing a memory location. The FABs 142 can operate in a variety of ways to perform these conversions and, in the present embodiment, employ interleaving algorithms. In the present embodiment each of the CAs 110, 114, 118, 122, 126, 130, 134 and 138 is pre-programmed for managing a subset of the main memory (e.g., certain subsets of the memory segments 26-36). The allocation of memory to the different CAs is known to the SADs 78 of the cores 46-76, such that the SADs are able to route the memory request signals to the appropriate CAs based upon the memory locations requested by the cores.

When the computer system 2 is operating according to the agent access memory configuration or is operating to access a remote memory segment when in the direct access memory configuration, the signals communicated between the cores 46-76 and the memory controllers 88-102 undergo several conversions as they proceed via the switches 80-86, the PAs 18-24, and the fabric 8. More particularly, a signal sent by one of the cores 46-76 undergoes a first conversion by the SAD 78 of the core, which results in the signal being communicated by the appropriate one of the switches 80-86 to an appropriate one of the PAs 18-24. Upon the signal being received at the appropriate one of the PAs 18-24, the FAB 142 of one of the CAs of the PA converts the signal into a signal appropriate for transmission over the fabric 8. As indicated above, this conversion at least in part involves a conversion of a physical memory address to a fabric address. After being transmitted through the fabric 8, the signal then arrives at another one of the PAs 18-24 (or potentially the same PA handling the signal before it entered the fabric), where the MTC 140 of one of the CCs of the PA again converts the fabric address back into a physical memory address. Finally, upon passing from that PA via another one of the switches 80-86 (or potentially the same switch as before) and arriving at an appropriate one of the MCs, the TAD 106 of that MC further converts the signal so that the desired memory location in main memory is accessed. Similar conversion processes occur when signals proceed in the opposite direction from the memory to the cores.

Although not necessarily the case, it is nonetheless often the case in the agent access memory configuration that the local physical address generated by the MTC 140 on the destination end of a given request differs from the local physical address generated by the SAD 78 on the request originating end. That is, the address sent to a MC as part of a memory read or write request is not necessarily the same physical address that was generated by the core that made the request. At the same time, while each memory location of the main memory can be referenced by way of a unique address, multiple locations within each of the memory segments 26-36 nevertheless can share the same address. As explained earlier, each of the memory segments 26-36 is a small, disjointed subset of the main memory. Consequently, the memory locations hosted within each of those memory segments can be accessed by using a smaller subset of the address that is used to access a location inside the main memory. Additionally, the MC view of the address cannot be used by that MC for coherency operations as the modified address can access an incorrect location if applied to a core.

By comparison, when the computer system 2 is operating according to the direct access memory configuration and accessing local memory, a somewhat less complicated set of conversions occur as signals are provided between the cores 46-76 and the MCs 88-102 directly by way of the switches 80-86 (but not by way of the PAs 18-24 or the fabric 8). In such cases, the cores 46-60 on the cell 4 are at most only able to communicate with the MCs 88-94 on that cell, while the cores 62-76 on the cell 6 are at most only able to communicate with the MCs 96-102 on that cell. Under these circumstances, a signal sent by one of the cores 46-76 undergoes a conversion by the SAD 78 of the core, which results in the signal being communicated by the appropriate one (or possibly two) of the switches 80-86 to the TAD 106 of an appropriate one of the MCs 88-102. The TAD 106 of the appropriate MC in turn converts the signal so that the desired memory location in main memory is accessed. Further, the addresses generated by the cores making the requests are the same as the addresses sent to the MCs 88-102, thus enabling the coherency algorithms to issue snoops to the local cores for maintaining coherency within the computer system 2.

Operating of the computer system 2 in the agent access memory configuration versus the direct access memory configuration as described above results in different operational attributes and advantages. More particularly, when the computer system 2 is operating according to the direct access memory configuration, only a low order of interleaving occurs (e.g., in which the various cores only have limited access to certain memory segments controlled by MCs on the same cells as those respective cores). While the memory latency associated with this manner of memory access is quite small, this manner of memory access is typically limited to small configuration computer systems. That is, although the direct access memory configuration can be employed in any size partition (or computer system), in general the direct access memory configuration does not support interleaves greater than what the resources in a given socket supports (for example, often interleaves across up to only 4 sockets are possible).

In comparison, when the computer system 2 is operating according to the agent access memory configuration, a high level of interleaving occurs in which the core(s) of a given socket and cell potentially have access to many memory locations governed by many MCs of many different sockets and cells. As a result, performance of the computer system 2 is enhanced by reducing the frequency with which hot-spots are encountered in large configuration computer systems such as those having 64 sockets. Although the communication of signals between the cores 46-76 and MCs 88-102 by way of the PAs 18-24 and fabric 8 is somewhat slower than can occur when signals are directly communicated between the cores and MCs (e.g., as in accordance with the direct access memory configuration), the overall or average level of memory access latency is still relatively low. Thus, the agent access memory configuration provides high bandwidth and scalability to large partition sizes, albeit it has higher latency in small partitions than is the case using the direct access memory configuration.

While each of the direct access and agent access memory configurations have relative advantages, in accordance with embodiments of the present invention the computer system 2 is capable of being operated so as to switch between the two memory configurations and thereby provide the advantages of both the agent access and the direct access memory configurations (at least at different times). More particularly, in accordance with these embodiments of the present invention, the computer system 2 is capable of dynamic re-sizing of memory in its partitions and, when that occurs, also capable of converting in its operation between the direct access memory configuration and the agent access memory configuration. By dynamically converting between the direct access and agent access memory configurations, a partition's memory performance can be optimized whenever new cells and/or new sockets are added/removed from the existing partition within the computer system 2. Based upon the specific needs/types of the computer systems and the applications running on those computer systems, the configuration of memory access in particular can be changed to provide optimal performance in terms of minimizing hot spots and memory latency.

Figure 2:
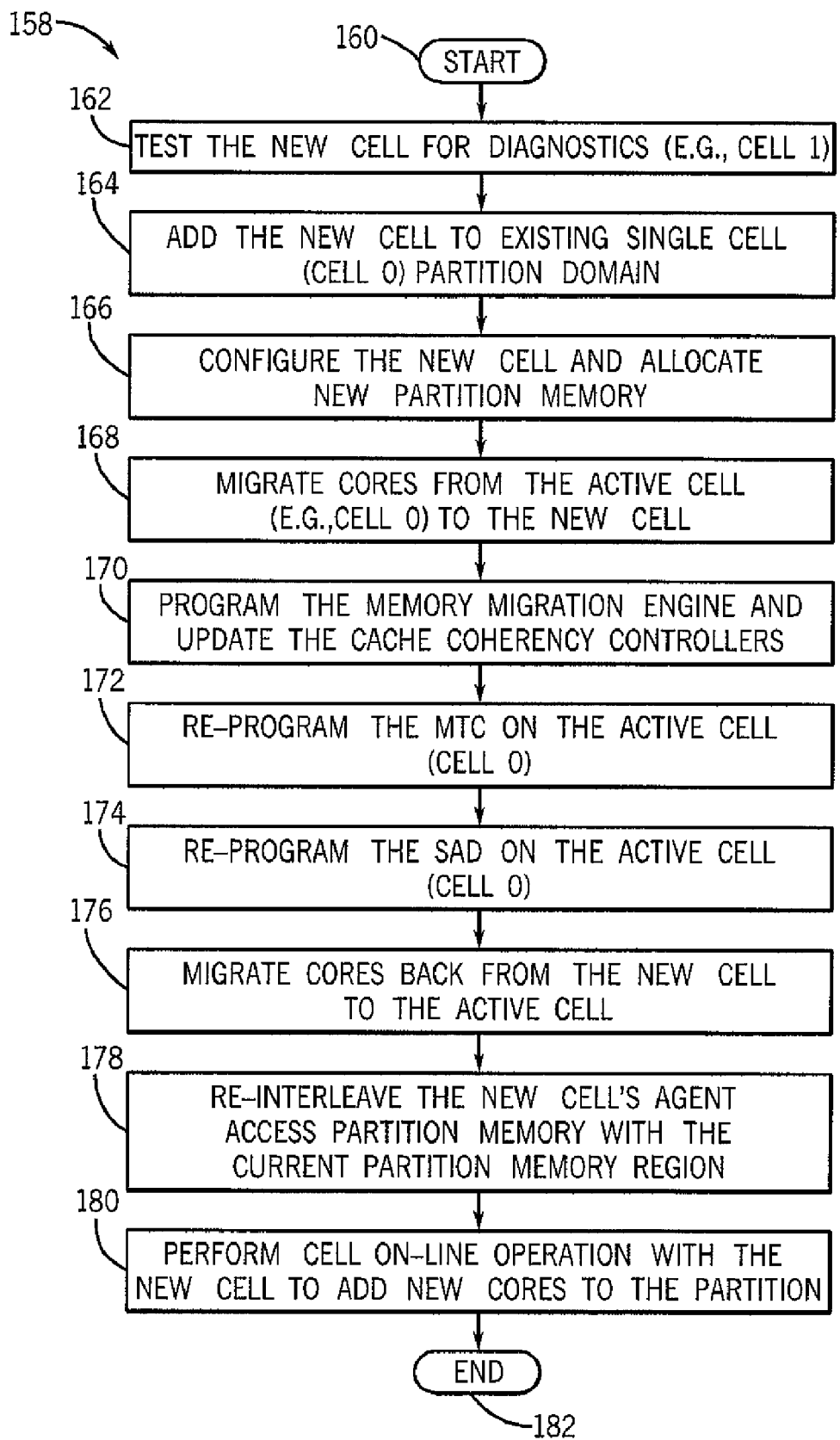
FIG. 2 is a flow chart showing exemplary steps of operation, which in particular relate to dynamically converting a direct access memory configuration of the computer system of FIG. 1 to an agent access memory configuration in accordance with one embodiment of the present invention.
Figure 3:
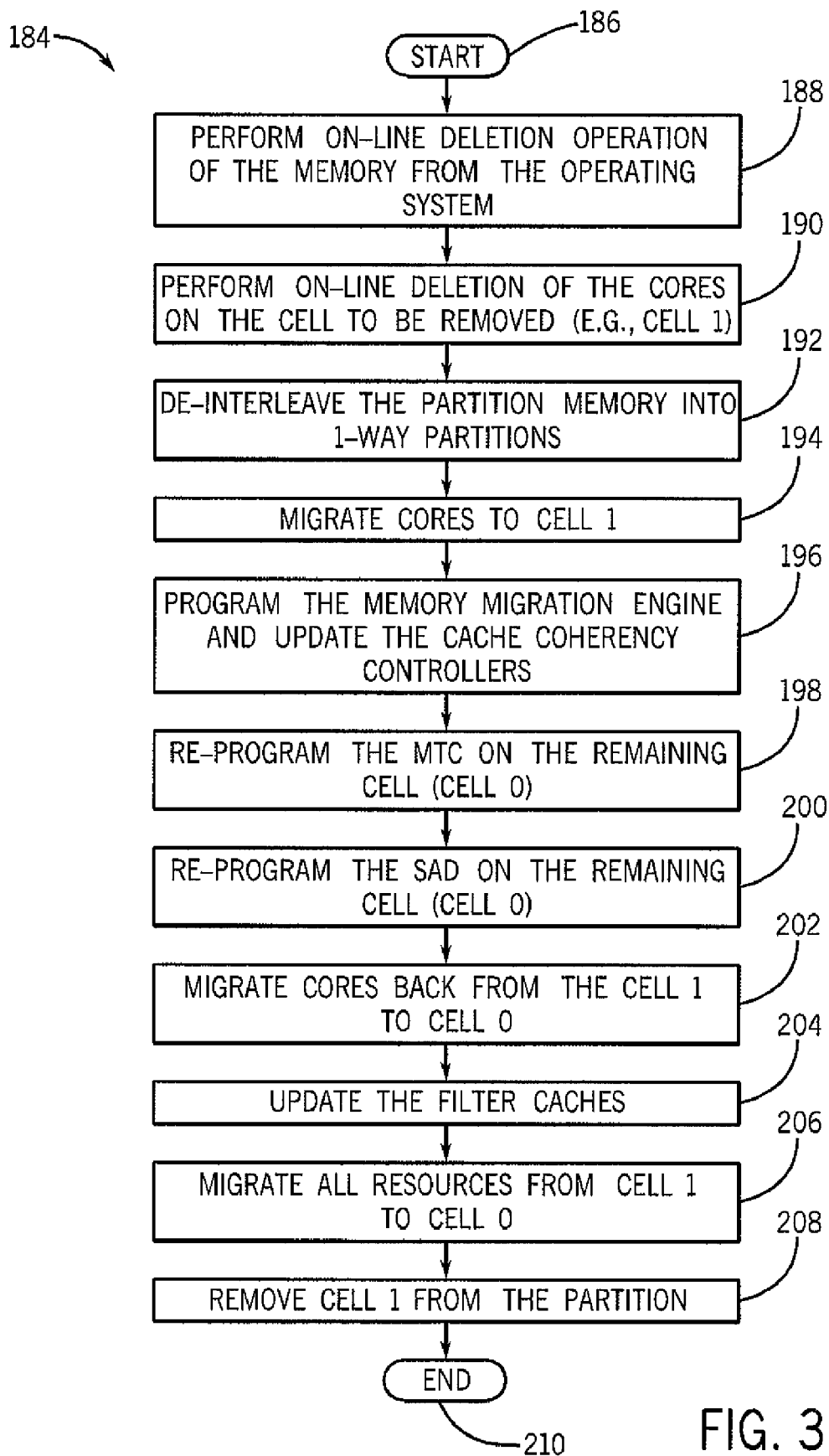
FIG. 3 is a flow chart showing exemplary steps of operation, which in particular relate to dynamically converting an agent access memory configuration of the computer system of FIG. 1 to a direct access memory configuration in accordance with one embodiment of the present invention.

Turning to FIGS. 2 and 3, flowcharts 158 and 184 respectively shows exemplary steps of operation in which the computer system 2 of FIG. 1 is dynamically converted between the direct access memory configuration and the agent access memory configuration in response to (or in conjunction with) the conversion of the computer system between being a single cell system having only the first cell 4 and a dual cell system having both the first and second cells 4 and 6. The flowchart 158 of FIG. 2 in particular relates to the conversion of the partition from being a single cell system to a dual cell system, and to the corresponding conversion of the computer system 2 from operating in the direct access memory configuration to the agent access memory configuration, while the flow chart 184 of FIG. 3 relates to the opposite conversions.

It should further be understood that, although for simplicity FIGS. 1-3 illustrate the computer system 2 that switches between the direct access and agent access memory configurations depending upon whether the computer system's partition employs one cell or two cells, in practice this transition typically occurs at a different threshold in terms of partition size, e.g., whether the partition includes four or less sockets or more than four sockets. Further, the addition/removal of a cell can, but need not necessarily, involve the physical coupling of a new cell with new memory resources (e.g., a memory card) to the computer system 2. Rather, in at least some circumstances, the addition of a cell to a given partition merely involves allocation of an idle cell to the given partition, or reallocation of a cell from another partition to the given partition. Likewise, in at least some circumstances, the removal of a cell from a given partition merely involves causing that cell to become idle, or reallocation of that cell to another partition.

Adding or removing cells can significantly vary the available memory. To enable efficient usage of all the memory blocks that are available to a partition after a conversion involving the addition or removal of one or more cells, all of the partition memory across all of the available is sockets is re-interleaved. More particularly with respect to the conversion from the direct access memory configuration to the agent access memory configuration when a cell is added to a partition as represented by FIG. 2, this process involves migrating the cores of the originally-existing cell to the newly-added cell and then back again such that, temporarily, all requests are directed through the PAs of both the old and the newly-added cell. A similar migration of cores is required also in the process of converting the agent access memory configuration to the direct access memory configuration when a cell is deleted from a partition as represented by FIG. 3.

Referring particularly to FIG. 2, the process of adding a cell and converting from the direct access memory configuration to the agent access memory configuration starts at a step 160 and then proceeds to a step 162. At the step 162, a "new" cell is added to an existing partition containing an "old" cell. For example, in the present embodiment, the second cell 6 of FIG. 1, referred to as "cell 1" from hereon, is added to the existing single partition containing the first cell 4, referred to as "cell 0" from hereon. As already described above, the "new" cell 1 is a cell board that is similar in structure and characteristics to the existing cell 0, and in particular includes multiple cores, MCs and partitioned memory segments. In the present example, the cell 1 is initially an unassigned resource with its power shut off, and that is available to be added to the existing partition containing the cell 0. However, as mentioned earlier, in other embodiments, the cell 1 can also initially co-exist in the computer system 2 as part of another existing partition, in which case, the process of FIG. 2 involves removal of that cell from its initially-assigned partition and reassignment of that cell to the partition containing the cell 0. Further, in some embodiments, the cell 1 can be installed in the computer system 2 of FIG. 1 at run time.

As indicated by the step 162, prior to integrating the cell 1 to the partition containing the cell 0, the cell 1 is subject to diagnostics testing in which all of the components present on that cell (e.g., memory, cores, switches, PAs, MCs, I/O-related resources and memory segments as well as possibly other components) are tested to ensure that all the components are in working condition and capable of performing their respective functions. Any flawed or non-working components are replaced prior to integrating the cell 1 with the cell 0 into the existing partition of the cell 0. After being tested for and demonstrating operability, the "new" cell 1 is then integrated with the fabric 8 of the existing partition to facilitate communication between the "old" cell, cell 0, and the cell 1, at a step 164. At this point, the cell 1 becomes a part of the partition ready for communication with the cell 0 and the process proceeds to a step 166.

At the step 166, the cell 1 is configured and the partition memory on the cell is allocated. By configuring the cell 1, properties of that cell, including all of its resources, are set so that the cell 1 is formally added to the partition and so that the cell 0 becomes aware of the presence of the cell 1. For example, a portion of the available memory on the cell 1 is configured as a cell local memory which is a non-interleaved memory available for all cores present in the partition. At the same time, all of the other memory on the cell 1 is configured as a global shared memory, also called partition memory, which is capable of being accessed by any of the cores either on the cell 1 or on another cell such as the cell 0. This new partition memory on the cell 1 is allocated to memory blocks adjacent to the pool of existing partition memory blocks of the cell 0, and thus is invisible to the operating system at this point. In addition, this partition memory of the cell 1 is added to the cache coherency controller on that cell to track cache line ownership of each line of the partition memory of the cell 1.

Further for example, address maps in the FABs 142 of the cell 1 are set up to configure that cell so that it is capable of accessing memory segments in accordance with the agent access memory configuration. Additionally for example, in at least some circumstances, the new partition memory of the cell 1 is added to the existing partition memory of the cell 0. Once the new partition memory is added in this manner, the cell 1 is able to access the existing partition memory on the cell 0 as well. Also, in addition to the configuration of the cell 1 at the step 166, the existing cell 0 is configured as well during that step in order to reflect the addition of the cell 1 into the partition and to enable the cell 0 to access the partition memory of the cell 1. Thus, after configuring the cell 0 and the cell 1, the cores and/or sockets on these cells can be actively used for communication with each other. The configuration of the cell 0 and the cell 1 during the step 166 is under the control of the firmware, with the integration of the cell 1 invisible to the operating system.

After configuration of the cells 1 and 0 at the step 166, the process subsequently advances to a series of steps, beginning with a step 168, at which the address decoders and other supporting hardware components on the cell 0 are re-programmed to convert that cell from the direct access memory configuration to the agent access memory configuration. With respect to the step 168 in particular, this step involves migrating the cores, one at a time, from the cell 0 to the cell 1 to facilitate changes to the source decoders of the cell 0 in a manner that avoids crashing the computer system 2 or stalling the processes executing on the cores of that cell. To migrate a core from the cell 0 to the cell 1, the architected state of that core, including for example, the registers and interrupts, is frozen and captured under the control of the firmware. This state information is then migrated to a "spare" core on the cell 1 so that the spare core can handle any processes that were originally being handled by the original core on the cell 0.

Upon completion of the migration process for a given original core on the cell 0, that original core becomes inactive and all of its processes are run on the spare core on the cell 1. Further, the same migration process is then performed again with respect to all of the cores on the cell 0 until all of the cores from that cell have been migrated to corresponding spare cores on the cell 1. The migration of the cores from the old cell 0 to the new cell 1 is facilitated by the firmware, and is invisible to the operating system associated with the partition so as to prevent any disruption to the regular processing of the computer system 2.

After the migration of all of the cores from the cell 0 to the cell 1 has been completed, the process then proceeds to a step 170, at which all of the address decoders and related hardware components (such as the cores and MTCs) of the cell 0 are reprogrammed, to facilitate conversion from the direct access memory configuration to the agent access memory configuration. The MTCs 140 in particular can be reprogrammed to include information as to whether the MTCs are responsible for tracking local cores (e.g., in the agent access memory configuration) or if the MCs will track the local cores (e.g., in the direct access memory configuration). In the present embodiment, the step 170 is performed by way of special, preprogrammed hardware components found within each of the PAs 18-24 of the cells (more particularly within the CCs 108, 112, 116, 120, 124, 128, 132 and 136), which can be referred to as memory migration engines. Also in the present embodiment, each memory migration engine is capable of moving one half of the memory segments in the attached socket, such that two memory migration engines are employed to move all of the memory segments in one socket as explained in more detail below. Further, each memory migration engine is capable of reviewing/traversing each cache line of the partition memory for both the cell 0 and the new cell 1 (e.g., the memory segments 26-36) and corresponding lines of the caches of the cores of the cell 0, as well as clearing tags of the caches. In other embodiments, implementations other than that mentioned above can be used.

More particularly, the memory migration engine(s) operate by updating the CCs 108, 112, 116 and 120 of the cell 0 and transitioning the directories of those CCs (used for tracking coherency) accordingly so that the cores on the cell 0 do not use any of the old copies of data still present in their respective caches. Data from all of the caches on the cell 0 is then flushed out and the CCs 108, 112, 116 and 120 gain exclusive access to each line in the memory segments 26-30 of that cell and write them back to idle. Further, the directory contents of those flushed cache lines are updated and the new partition memory of the cell 1 is added to the directories to enable the MCs to keep track of the cache lines present in every core on both the cell 0 and the cell 1. No cores on the cell 0 are referenced after this step is completed. The firmware controls the cores on cell 0 so the control is transferred to the cores on cell 1 for any further processing.

Next, at a step 172, all of the MTCs 140 on the cell 0 are reprogrammed for operation in accordance with the agent access memory configuration rather than the direct access memory configuration. More particularly, the MTCs 140 are reprogrammed for use in conjunction with the fabric to enable the transmission of memory request signals to the MCs 88-102 and thereby to the memory segments 26-36. As mentioned earlier, when the computer system 2 is operating in the direct access memory configuration accessing local memory segments, all memory requests from cores to MCs located on the same cell are directed to those MCs without passing through any of the PAs 18-24 or the fabric 8. At such time, the only signals that are communicated to the PAs 18-24, and governed by the MTCs 140 in particular, are those intended for the I/O subsystems or cores accessing remote memory segments. Reprogramming of the MTCs 140, however, makes it possible for the PAs 18-24 to handle signals arriving from the cores 46-76 that are intended eventually for the MCs 88-102. It should be further noted that, notwithstanding changes to the MTCs 140, the TADs 106 of the MCs 88-102 need not be re-programmed, since bank addresses of the memory segments 26-36 do not change.

Subsequent to the step 172, at a further step 174 each of the SADs 78 of the cores 46-60 on the original cell 0 are reprogrammed by the firmware to operate according to the agent access memory configuration rather than the direct access memory configuration. More particularly, the SADs 78 are reprogrammed so that all memory requests are directed to one of the PAs 18-24 instead of directly to one of the MCs 88-102 (via one or more of the switches 80-86) as during operation according to the direct access memory configuration. Thus, after the SADs 78 are re-programmed, all requests for memory accesses are directed to respective ones of the PAs 18-24 on the respective cells, which in turn direct such requests onto the fabric 8 and thus further to additional (or possibly the same) ones of the PAs, where those signals are handled by the respective MTCs 140 of those PAs. Typically, firmware running on a management subsystem (or possible on the cores controlled by firmware) use CSR writes to change the programming of the SADs 78. Reprogramming of the SADs 78 at this point in the process represented by FIG. 2 is particularly possible since, subsequent to the cleaning of tags in the step 170, there is no traffic to the cores on cell 0.

From the above description, it is evident that the operation of the MTCs 140 and SADs 78 is primarily responsible for determining whether the computer system 2 is operating according to the direct access memory configuration or the agent access memory configuration. The FAB 142 however remains unchanged when switching between direct access and agent access memory configurations. In the present embodiment, the MTCs 140 and SADs 78 are pre-programmed to be capable of both the direct access memory configuration and the agent access memory configuration. Upon receiving the appropriate request(s) from the firmware, however, the internal characteristics of the MTCs 140 of the CCs 108, 112, 116 and 120 are modified from being appropriate for the direct access memory configuration to being appropriate for the agent access memory configuration. Likewise, upon receiving the appropriate request(s) from the firmware, the internal characteristics of the SADs 78 also are changed from being appropriate for the direct access memory configuration to being appropriate for the agent access memory configuration.

More particularly with respect to the MTCs 140, each of the MTCs 140 has entries that each respectively correspond to a respective memory segment. Each of the entries can be set independently by the firmware for either agent access or direct access memory configurations. The MTC entries include MC addresses for different memory lines, and each memory address typically remains the same regardless of whether the line is to be accessed via the direct access memory configuration or the agent access memory configuration, in order to facilitate the conversion process (e.g., to facilitate the mapping of memory from a deleted cell to a remaining cell). To distinguish between whether a given MC address is for use in the agent access memory configuration or the direct access memory configuration, firmware sets or clears a bit in each such MTC entry indicating whether the corresponding memory block is for use in the agent access memory configuration or the direct access memory configuration. Thus, each MTC entry corresponds to a single memory block, and the direct access/agent access attribute can be set independently for each entry. Additionally, although the SADs 78 and related components are re-programmed to facilitate the conversion from the direct access memory configuration to the agent access memory configuration, every direct access memory address used as an alias address for satisfying read requests to the socket home agent remain the same.

Once the SADs 78 have been re-programmed in the step 174 such that the memory configuration on the cell 0 has been changed from the direct access memory configuration to the agent access memory configuration, the core(s) that were migrated from the cell 0 to the cell 1 are migrated back to their original location(s) on the cell 0, at a step 176. In particular, during this step, the architected states of the cores of the cell 0 are retrieved and the cores can re-establish all active process execution. This procedure is largely the reverse of the procedure performed during the step 168 discussed above. Upon completion of this step, the process next advances to a step 178.

The step 178 is optional and can be skipped. Nevertheless, for optimal utilization of all of the memory segments 26-36 of the computer system 2 that are available when operating in the agent access memory configuration, at the step 178 the partition memory on the cells 0 and 1 is re-interleaved with the memory segments. The memory segments 26-36 are re-interleaved by collaboration between the firmware and the hardware, such as the memory migration engines and the MTCs, by executing special software to facilitate such a re-interleaving. By re-interleaving all of the available partition memory, the cell 0 becomes capable of accessing not only the partition memory of the cell 0 but also the partition memory of the cell 1 (and vice-versa). This reduces memory access latency and diminishes the frequency of memory "hot-spots" relative to the performance that could be obtained if the cells 0, 1 were only able to access their own memory (e.g., by operating in the direct access memory configuration).

After completing (or skipping) the step 178, the process then advances to a step 180. At this step, an on-line addition operation is performed to expose the newly-added cell 1, its cores 62-76 and its partition memory to the operating system, thereby finalizing the conversion of the computer system 2 from the direct access memory configuration to the agent access memory configuration. In particular, by exposing the new cell 1 to the operating system, the new cell 1 with its cores 62-76 can now be used for active processing of data in addition to the existing cell 0. At this point, the process 158 of conversion from the direct access memory configuration to the agent access memory conversion is complete and the process ends at a step 182.

Turning to FIG. 3, an additional flowchart 184 shows exemplary steps of another process by which the computer system 2 is converted from the agent access memory configuration to the direct access memory configuration, in accordance with at least some embodiments of the present invention. This conversion is performed when one or more cell(s) is/are deleted from a partition so as to leave only a single cell in the partition, in order to achieve memory latency on the remaining cell of the partition that would have been achieved if the remaining partition had been booted with that single-cell configuration. In the present example of FIG. 3, it is presumed that the computer system 2 initially operating in accordance with the agent access memory configuration begins operation with a partition having two cells (namely, the cells 0 and 1), but then ends operation with only a single cell (namely, the cell 0). However, it should be understood (as is the case with respect to the process of FIG. 2) that the present conversion operation is equally applicable to computer systems that are reduced from having a higher number of cells (e.g., more than two, and particularly more than four) to a lesser number of cells.

As shown in FIG. 3, the process begins at a step 186 and then proceeds to another step 188. At the step 188, the partition memory on the cell that is being removed (cell 1) is deleted by way of an on-line deletion operation. By performing this operation, the partition memory on the cell 1 is made invisible to the operating system, so as to facilitate an on-line removal of the cell 1 without affecting the executing processes on the cores of the cell 0. Additionally at the step 188, the active processing on the cores 62-76 of the cell 1 is terminated to prevent the computer system 2 of FIG. 1 from crashing while deleting that cell. Further during the on-line deletion operation, the operating system releases all of the socket local memory of the cell 1 and also the partition memory of the cell 1 (e.g., the segments 32-36)) to ensure that the remaining memory can fit onto the remaining cell 0. Because there are two sockets on the cell 0, the partition memory will typically be in groups of two (such that it can be interleaved across both of the two sockets of the cell 0), and the groups are claimed directly by the TADs in the cell 0.

Next, at a step 190, all of the cores 62-76 of the cell 1 are deleted from the operating system by way of an on-line deletion operation. After this on-line deletion operation has been performed on the cores of the cell 1, these cores are not used anymore for any active process execution. That the cores 62-76 attain this inactive status is desirable in order to preclude the computer system 2 from crashing in an event where the cell 1 still has processes running on it after that cell is removed from the partition. Subsequently, at a step 192, all of the partition memory previously available to both the cell 0 and cell 1 is de-interleaved into a 1-way partition memory capable of being accessed only by the remaining cell 0 in the partition. De-interleaving of the partition memory takes place by way of special software under the collaboration of the memory migration engines and the firmware.

Subsequently, at a step 194, the cores on the cell 0 are migrated to the cell 1 so as to allow modification of the source decoders and address maps of the cores on the cell 0 to be converted from the agent access memory configuration to the direct access memory configuration. Similar to the step 168 of FIG. 2, migration of each of the cores 46-60 of the cell 0 involves capturing (or "freezing") the present architected state of that core, and then transferring that state of the core to a "spare" core on the cell 1, which resumes all of the active processing for the core that has been migrated from the cell 0. Each core is migrated in succession, with the same process being repeated until all of the cores from the cell 0 have been migrated to the corresponding spare cores on the cell 1. The migration of the cores 46-60 from the cell 0 enables the SADs 78 on those cores to be re-programmed for operation according to the direct access memory configuration, since after the migration those cells are precluded by firmware from performing any active processing. At the same time, since the migration of the core processing to the cores 62-76 of the cell 1 is invisible to the operating system, the computer system 2 continues to perform the same overall process after the migration (except by different cores) as was occurring before the migration.

After the step 194, the process then advances to a step 196 at which the memory migration engine(s) are programmed to remove all references to cell 0 cores from both the CC directory (more particularly, the CC filter tag cache or "RTAG", which is designed to track remote ownership of memory lines) and the MC directory. This is done at least in part so that there are not any references to the cell 0 cores, and so that updating the SAD becomes easier (or becomes possible if the SAD does not support dynamic changes). More particularly, the cache entries in the cores of the cell 0 are cleared and copied back to the appropriate memory segments 26-36 to prevent any loss of data, and the directories are updated to reflect the cleared caches. Additionally in the step 196, the directory entries on the cell 0 are modified to reflect the removal of the partition memory of the cell 1 (e.g., the memory segments 32-36) so that the directories include only the entries for the partition memory of the cell 0 (e.g., the memory segments 26-30). Again as was the case in the step 172, the TADs 106 in the MCs 82-106 are not re-programmed as the bank addresses of the memory segments 26-36 on the cell 0 are not affected by the removal of the partition memory of the cell 1.

Next at a step 198, the MTCs 140 on the CCs 108, 112, 116 and 120 of the cell 0 are re-programmed. As previously mentioned, the MTCs 140 are responsible for translating global/fabric addresses received off of the fabric 8 into local physical addresses for accessing memory locations when the computer system 2 is operating according to the agent access memory configuration. However, when the computer system 2 is operating in the direct access memory configuration, the MTCs 140 are used only for accessing I/O systems and any possible remaining remote cores, and all of the memory request signals are transferred only to the MCs 88-94 of the cell 0. Thus, while the MTCs 140 are pre-programmed for both operation according to each of the agent access memory configuration and the direct access memory configuration, at the step 198 (with the aid of the firmware) the MTCs 140 are re-programmed to convert their configuration particularly to the direct access memory configuration, such that the MTCs no longer operate to translate global/fabric addresses into local addresses and the fabric 8 is no longer utilized for memory accesses. As discussed above, this re-programming can involve updating by firmware of a particular bit per entry within the MTCs 140.

Further at a step 200, the SADs 78 on each of the cores 46-60 on the cell 0 are re-programmed. As is the case with the MTCs 140, the SADs 78 are pre-programmed for operation in both the agent access memory configuration and the direct access memory configuration. When converting from the agent access memory configuration to the direct access memory configuration, the firmware re-programs the SADs 78 on each of the cores 46-60 of the cell 0 to route all memory requests directly to one of the MCs 88-94 on the same cell rather than to any of the PAs 18-24. Thus, as was the case with respect to the process of FIG. 2, the process of FIG. 3 in the present embodiment involves each of the programming of the memory migration engine, the updating of the cache coherency controllers, and the re-programming of the MTCs 140 and the SADs 78 when the cores 46-60 of the cell 0 have been migrated to the cell 1. Once the MTCs 140 and the SADs 78 have been re-programmed, at a step 202 the cores (that is, the states of the cores) are migrated back from the cell 1 to the cell 0, one at a time, to resume all active processing in the newly-determined direct access memory configuration.

Next, at a step 204, the directory caches (particularly the RTAGs mentioned above) in the CCs of the cell 0 are updated to prevent any memory accesses to the partition memory of the cell 1 (e.g., the memory segments 32-36). As mentioned above, each such directory cache is assigned a subset of memory segments (home segments) and is responsible for tracking ownership of the memory segments other than its own home segments. After the cell 0 has been converted to the direct access memory configuration and the cores 62-76 on the cell 1 have become inactive, the directory caches in the CCs of the cell 0 are cleared to prevent any further snoops from being issued to cores on cell 1 for local direct access memory. Subsequently, at a step 206, all the remaining resources, such as the interrupts and input output systems, of the cell 1 are moved to the cell 0. From this point onwards, the cell 0 becomes responsible for handling all those resources.

At a step 208, the cell 1 is then removed from the partition and is no longer exposed to the operating system. Before this point, even though an on-line deletion operation to remove the cell 1 had been performed, the cell 1 was available to aid the transition from the agent access memory configuration to the direct access memory configuration. Depending upon the embodiment or circumstance, the removed cell 1 can be completely removed from the computer system 2 or it can exist within the computer system 2 as an unassigned resource that can again be added to any partition within that computer system at any point. After removal of the cell 1 from the partition, only cell 0 is left behind, which accesses the partition memory according to the direct access memory configuration. The process of FIG. 3 then ends at a step 210.

While the processes described above with respect to the flow charts 158 and 184 of FIG. 2 and FIG. 3, respectively, show examples of processes by which the memory performance of the computer system 2 can be optimized by converting dynamically between a direct access memory configuration and an agent access memory configuration, the present invention is also intended to encompass a variety of other processes, including modifications and/or refinements of the above-described processes. In particular, the present invention is intended to encompass a variety of processes that allow for dynamic on-line conversion of the memory configuration, without rebooting of the computer system. The particular process steps employed above to facilitate conversion between the agent access and direct access memory configurations, the cache coherency protocols employed by the CCs, the interleave algorithms employed by the PAs, and other features can all be varied depending upon the type/needs of the computer system being used and the memory being used.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of operating a computer system, the method comprising:
   operating a first cell of the computer system in accordance with a first memory access configuration, wherein in the first memory access configuration, a first processing core of the first cell accesses a memory controller in the first cell without using at least one processor agent and a fabric;
   migrating a first attribute of the first processing core of the first cell to a second cell of the computer system, wherein migrating the first attribute of the first processing core causes the first processing core to become inactive;
   after the first processing core becomes inactive, configuring a first portion of the first cell so that the first cell is capable of operating in accordance with a second memory access configuration;
   migrating at least one of the first attribute and a second attribute from the second cell back to the first processing core of the first cell, wherein migrating at least one of the first attribute and the second attribute from the second cell back to the first processing core causes the first processing core to become active; and
   after the first processing core becomes active, operating the first cell in the second memory access configuration, wherein in the second memory access configuration, the first processing core accesses the memory controller in the first cell using the at least one processor agent and the fabric.

2. The method of claim 1, wherein the first memory access configuration is a direct access memory configuration and the second memory access configuration is an agent access memory configuration.

3. The method of claim 1, further comprising at least one of:
   performing at least one diagnostic test in relation to the second cell;
   performing on-line adding of the second cell to a first partition that also includes the first cell, wherein performing the on-line adding of the second cell does not cause rebooting of the computer system;
   configuring the second cell; and
   allocating additional partition memory associated with the second cell.

4. The method of claim 1, further comprising, subsequent to the migrating of the first attribute to the second cell, at least one of:
   programming a memory migration engine; and
   updating at least one coherency controller of the first cell.

5. The method of claim 2, further comprising, subsequent to the migrating back to the first processing core, at least one of:
   interleaving first and second memory segments associated with the first and second cells, respectively, in relation to one another; and
   operating at least one processing core of the second cell as part of a single partition including the first cell.

6. The method of claim 2, wherein when operating in accordance with the agent access memory configuration, the first processing core accesses a first memory location associated with the second cell.

7. The method of claim 2, wherein when operating in accordance with the agent access memory configuration, the first processing core accesses a first memory location by sending a memory request signal by way of a first switch to a first processor agent of the first cell, which in turn communicates a first related signal to a second processor agent of the second cell by way of a fabric, the second processor agent sending by way of a second switch a second related signal to a first memory controller of the second cell that governs a first memory segment containing the first memory location.

8. The method of claim 1, further comprising:
   to remove the second cell from the computer system, terminating active processing of any processing cores of the second cell;
   after terminating the active processing of any processing cores of the second cell, migrating a state of the first core of the first cell to the second cell;
   configuring the first portion of the first cell to switch the first cell from the second memory access configuration to the first memory access configuration;
   after configuring the first portion to switch from the second memory access configuration to the first memory access configuration, migrating the state of the first core back to the first cell; and
   after migrating the state of the first core back to the first cell, operating the first cell according to the first memory access configuration.

9. The method of claim 8, further comprising, subsequent to the migrating the state of the first core back to the first cell, at least one of:
   updating at least one filter cache;
   migrating an additional resource from the second cell to the first cell; and
   removing the second cell from a partition containing the first cell.

10. The method of claim 2, wherein when operating in the direct access memory configuration the first processing core is restricted to accessing memory locations associated with the first cell.

11. The method of claim 1, wherein the first attribute is an architectural state including at least one of a register state and an interrupt state.

12. The method of claim 1, wherein the first portion of the first cell that is configured includes at least one of a memory translation cam (MTC) and a source address decoder (SAD).

13. A method of operating a computer system, the method comprising:
at a first time, operating the computer system in accordance with an agent access memory configuration in which a first processing core of a first cell of the computer system communicates with a first memory controller of the first cell of the computer system by way of at least one processor agent and a fabric;
at a second time that one of precedes and occurs after the first time, operating the computer system in accordance with a direct access memory configuration in which the first processing core of the first cell of the computer system communicates with the first memory controller of the first cell, not by way of the at least one processor agent and not by way of the fabric; and
performing a transitioning procedure by which the computer system switches between the operating of the computer system in accordance with the agent access memory configuration and the operating of the computer system in accordance with the direct access memory configuration; and
during the transitioning procedure:
migrating a first attribute of the first processing core of the first cell to a second cell of the computer system;
after the migrating, configuring a first portion of the first cell so that the first cell is capable of operating in accordance with one of the direct and agent access memory configurations; and
migrating at least one of the first attribute and a second attribute from the second cell back to the first processing core of the first cell.

14. The method of claim 13, further comprising:
reprogramming at least one of a memory translation cam (MTC) and a source address decoder (SAD) associated with the first cell during the transitioning procedure,
whereby the computer system performs different manners of accessing memory before and after the transitioning procedure, at least one of which involves interleaving.

15. A computer system comprising:
first and second memory segments;
a first cell having a first processing core and a first memory controller;
a second cell having a second processing core and a second memory controller,
wherein the first and second memory controllers are configured to govern govern the first and second memory segments, respectively;
a fabric; and
at least one processor agent coupled at least indirectly to the first processing core, to the second memory controller, and to the fabric,
wherein when the computer system operates in accordance with an agent access memory configuration, the first processing core is configured to communicate with the first memory controller by way of the at least one processor agent and the fabric, and
wherein when the computer system operates in accordance with a direct access memory configuration, the first processing core is configured to communicate with the first memory controller independently of the at least one processor agent and the fabric; and
a mechanism to perform a transitioning procedure by which the computer system switches between operating of the computer system in accordance with the agent access memory configuration and operating of the computer system in accordance with the direct access memory configuration, the mechanism to, during the transitioning procedure:
migrate a first attribute of the first processing core of the first cell to the second cell;
after the migrating, configure a first portion of the first cell so that the first cell is capable of operating in accordance with one of the direct and agent access memory configurations; and
migrate at least one of the first attribute and a second attribute from the second cell back to the first processing core of the first cell.

16. The computer system of claim 15, wherein the computer system includes a partition that includes the first cell when the computer system operates in accordance with the direct access memory configuration, and that further includes the second cell including the second memory controller when the computer system operates in accordance with the agent access memory configuration.

17. The method of claim 8, further comprising at least one of:
performing an on-line deletion with respect to at least one memory segment associated with the second cell;
performing an on-line deletion with respect to at least one processing core of the second cell; and
de-interleaving partition memory associated with the first and second cells into one-way partition memory.

* * * * *

UNITED STATES PATENT AND TRADEMARK OFFICE
CERTIFICATE OF CORRECTION

PATENT NO. : 7,904,676 B2
APPLICATION NO. : 11/741933
DATED : March 8, 2011
INVENTOR(S) : Bryan Hornung et al.

Page 1 of 1

It is certified that error appears in the above-identified patent and that said Letters Patent is hereby corrected as shown below:

In column 24, line 2, in Claim 15, after "govern" delete "govern".

In column 24, line 4, in Claim 15, after "fabric;" delete "and".

Signed and Sealed this
Thirteenth Day of September, 2011

David J. Kappos
*Director of the United States Patent and Trademark Office*